Dec. 5, 1950     P. S. CARTER     2,532,993
BAND PASS FILTER

Filed June 21, 1945     7 Sheets-Sheet 1

INVENTOR.
Philip S. Carter
BY H. S. Grover
ATTORNEY.

Dec. 5, 1950  P. S. CARTER  2,532,993
BAND PASS FILTER
Filed June 21, 1945  7 Sheets-Sheet 2
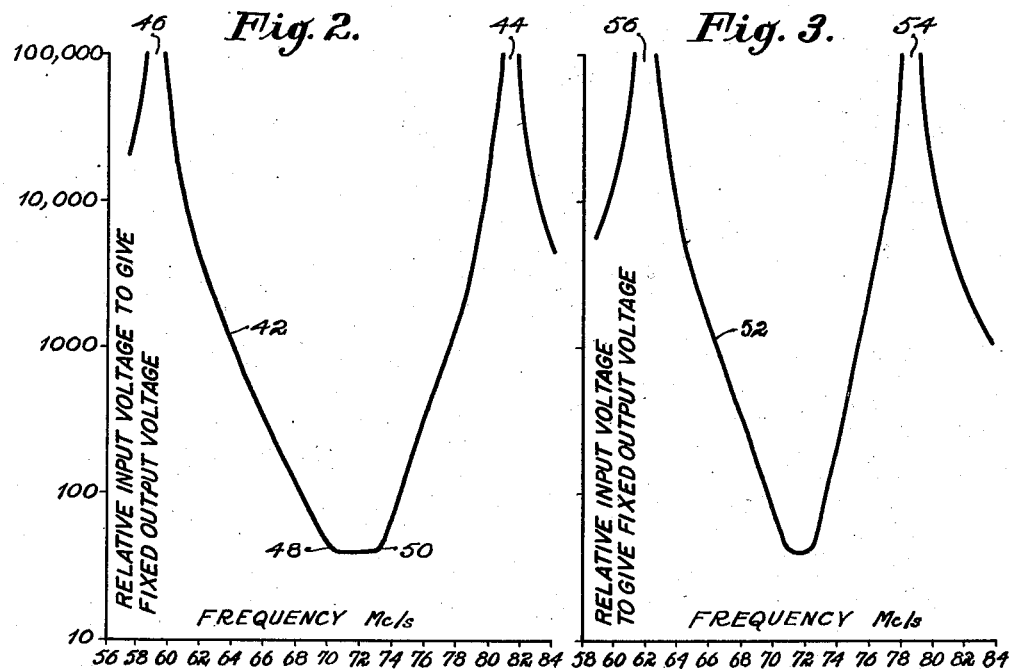
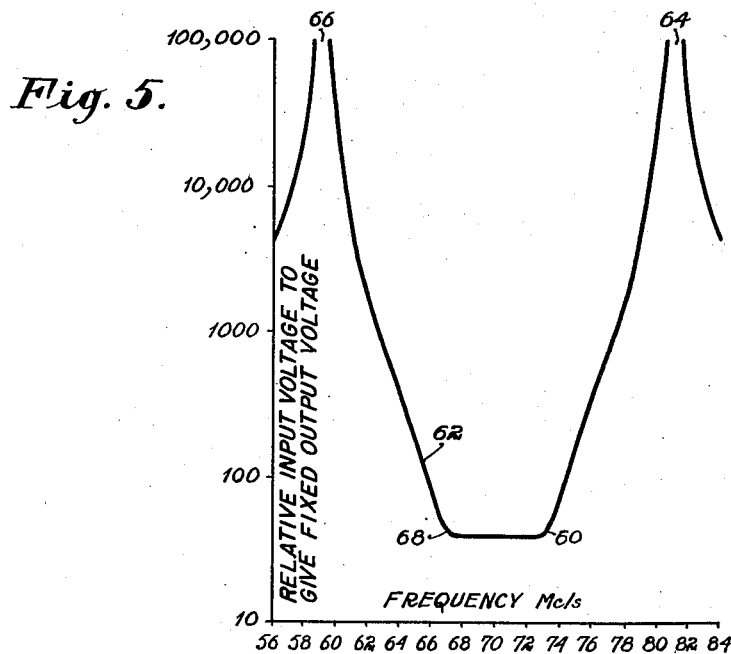
INVENTOR.
Philip S. Carter
BY
ATTORNEY.

Dec. 5, 1950 P. S. CARTER 2,532,993
BAND PASS FILTER
Filed June 21, 1945 7 Sheets-Sheet 3
Fig. 6.
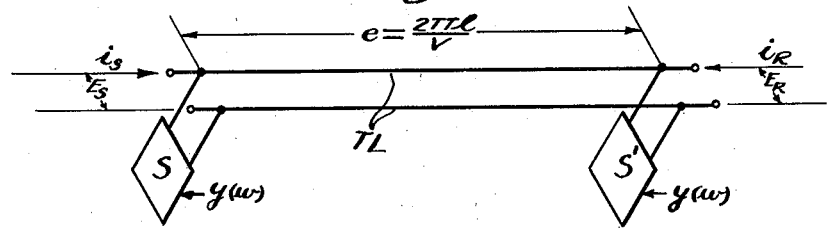
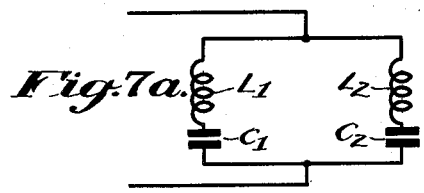
Fig. 7a.
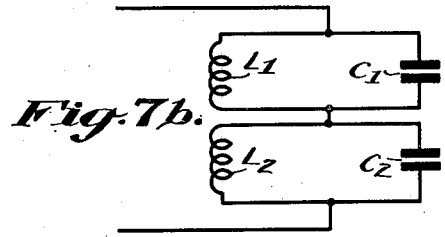
Fig. 7b.
Fig. 8a.
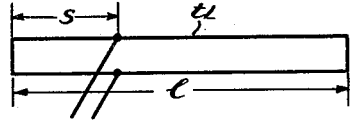
Fig. 8b.
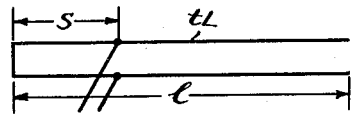
Fig. 8c.
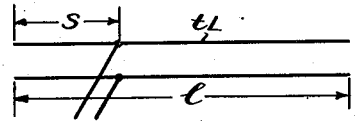
Fig. 9.
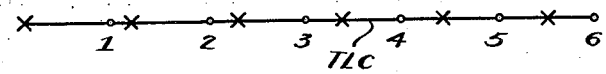
INVENTOR
PHILIP S. CARTER
BY H. S. Grover
ATTORNEY Dec. 5, 1950 P. S. CARTER 2,532,993
BAND PASS FILTER
Filed June 21, 1945 7 Sheets-Sheet 4
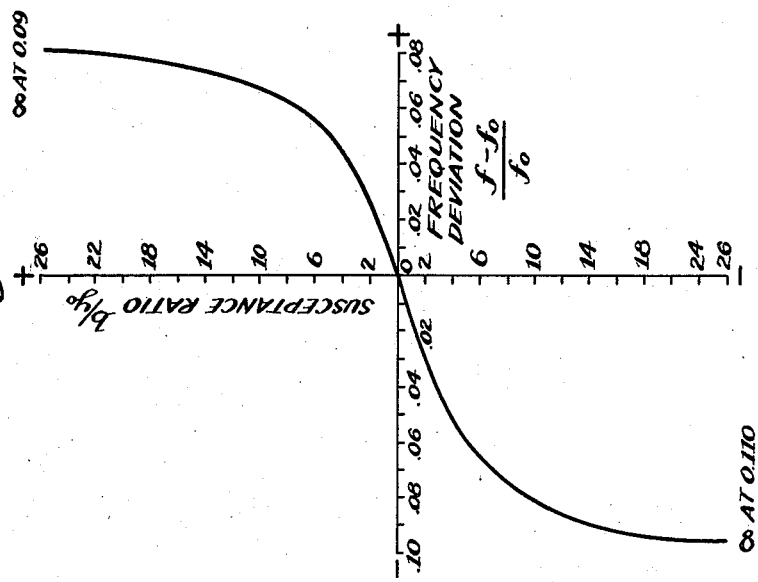
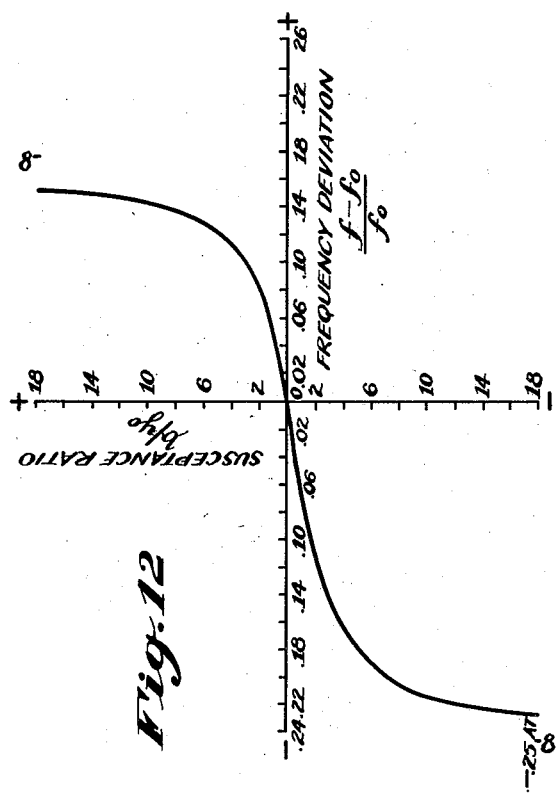
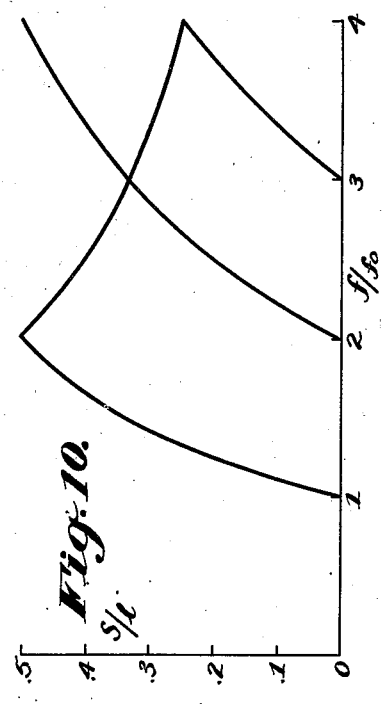
INVENTOR
PHILIP S. CARTER
BY
ATTORNEY Dec. 5, 1950   P. S. CARTER   2,532,993
BAND PASS FILTER
Filed June 21, 1945   7 Sheets-Sheet 5

INVENTOR
PHILIP S. CARTER
BY H. S. Grover
ATTORNEY

Dec. 5, 1950   P. S. CARTER   2,532,993
BAND PASS FILTER
Filed June 21, 1945   7 Sheets-Sheet 6
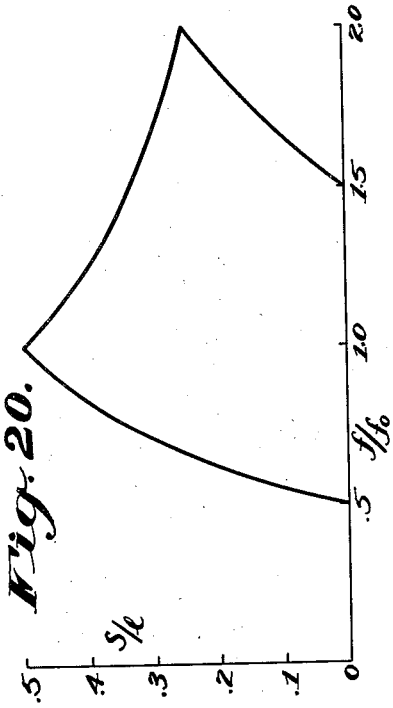
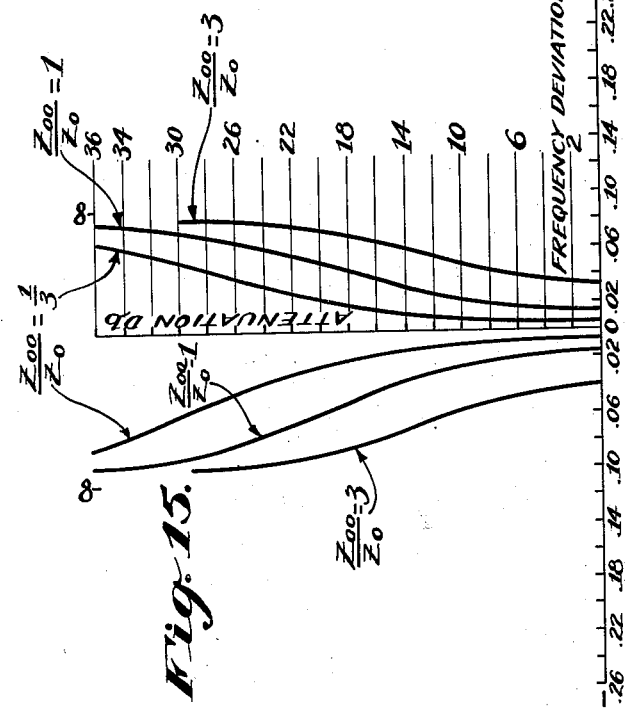
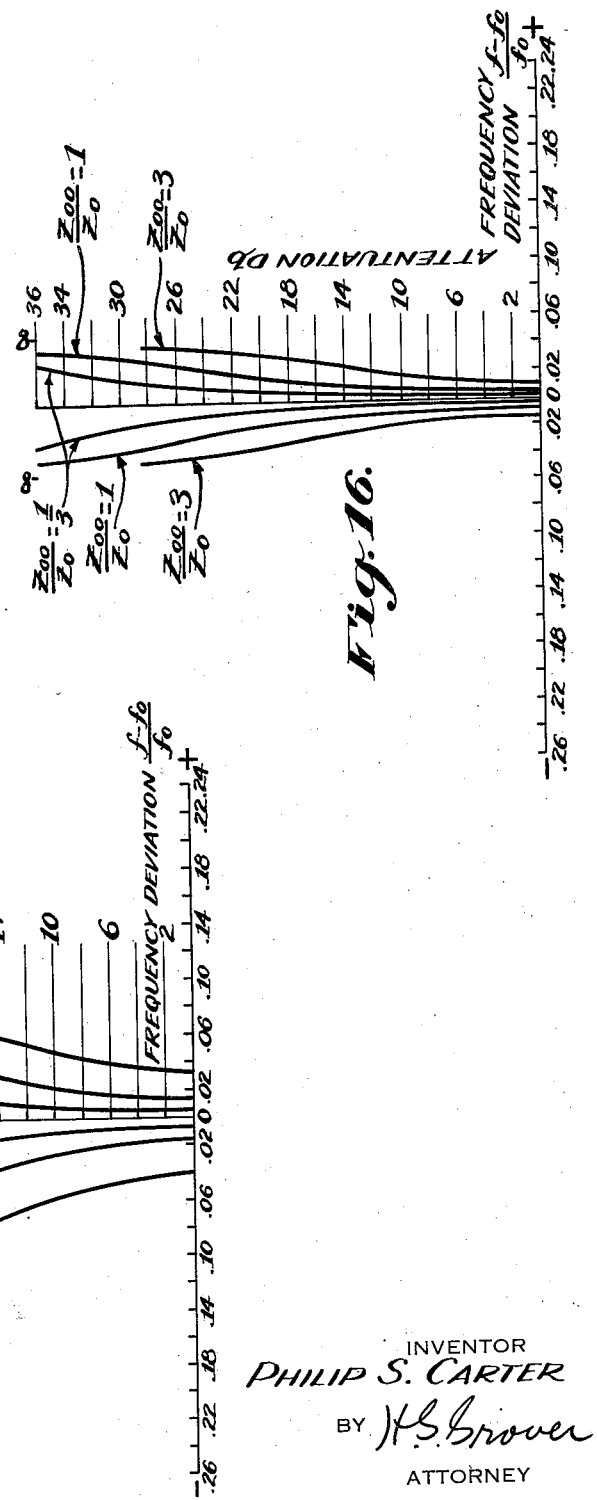
INVENTOR
PHILIP S. CARTER
BY H.S. Grover
ATTORNEY Dec. 5, 1950

P. S. CARTER 2,532,993

BAND PASS FILTER

Filed June 21, 1945

INVENTOR
PHILIP S. CARTER
BY
ATTORNEY

Patented Dec. 5, 1950

2,532,993

UNITED STATES PATENT OFFICE 2,532,993

BAND-PASS FILTER

Philip S. Carter, Port Jefferson, N. Y., assignor to Radio Corporation of America, a corporation of Delaware Application June 21, 1945, Serial No. 600,724

7 Claims. (Cl. 178—44)

The present invention relates to filter networks and, more particularly, to band pass filter networks in which the impedance elements are constituted by transmission line sections.

An object of the present invention is to improve the sharpness of band selection of band pass filters.

Another object of the present invention is to improve the rejection of frequencies arriving at a band pass filter which lie outside of the band pass characteristic.

A further object of the present invention is the provision of a band pass filter in which the impedance elements are constituted by concentric transmission line sections.

Another object of the present invention is the provision of a band pass filter, as aforesaid, in which the shape of the band pass characteristic can be adjusted by varying the impedance of the concentric line sections.

The foregoing objects, and others which may appear from the following detailed description, are accomplished in accordance with the principles of the present invention by providing a filter network in the form of a section of concentric transmission line having connected thereto in a shunt relationship, sections of concentric transmission lines which are spaced apart a distance equal to one quarter of the mean operating wavelength. The shunt transmission line sections may be either open ended or short-circuited and their lengths are so adjusted as to act as short circuits on the line at pre-assigned frequencies lying beyond each end of the band pass characteristic curve. The characteristic impedance of the shunt sections are so adjusted as to obtain the desired shape of the characteristic curve.

The present invention will be more fully understood by reference to the following detailed description which is accompanied by a drawing in which Figure 1 illustrates in longitudinal cross-section a physical embodiment of the invention, while Figures 2 and 3 are curves illustrating the band pass effect of an embodiment constructed in accordance with Figure 1; Figure 4 illustrates a modification of the structure shown in Figure 1 which is so arranged as to have a symmetrical band pass characteristic; Figure 5 is a curve illustrating the band pass characteristic of the filter of Figure 4 while Figures 6, 7a, 7b, 8a, 8b, 8c and 9 are schematic diagrams of transmission lines and filter elements, useful in understanding a theory of operation of the present invention and Figures 10 to 20 inclusive are curves illustrating the effects of varying the circuit parameters of the filter of the present invention.

Referring, now, to Figure 1 there is shown in longitudinal cross-section a transmission line TL having an outer cylindrical shell 10 and an inner conductor 11 concentrically located with respect to the shell 10. The inner conductor 11 is maintained in concentric relationship with the outer shell by means of suitably arranged insulators (not shown). At one point across the transmission line TL is connected a filter element 12 in the form of a coaxial transmission line having an outer shell 13 connected to the outer shell 10 of transmission line TL and an inner conductor 14 connected to the inner conductor 11 of transmission line TL. One end of the filter element is short-circuited by an end plate 15, the other end being left open. At a distance equal to one quarter of the mean operating wavelength from the point of connection of the first filter element 12 is connected a second similar filter element 16 having an outer shell 17 and an inner conductor 18. It, likewise, is closed at one end by a short-circuiting plate 19. The filter elements 12 and 16 are so arranged that the distance from the closing plate 15 and 19 to the inner conductor 11 of the transmission line TL is somewhat less than one-half of the midband wavelength. In the example shown in Figure 1, distance is equal to 160 electrical degrees at the midband frequency. The open end portions of sections 12 and 16 extend beyond the inner conductor 11 of transmission line TL distances slightly greater than one quarter of the mean operating wavelength, that is, in the particular example of Figure 1, 110 electrical degrees. Now, since the lengths from the shorting plates 15 and 19 to the conductor 11 of transmission line TL are slightly less than one-half of the operating wavelength for the midband frequency, as the frequency increases, that is, the wavelength decreases, these sections become more and more nearly equal to one-half of the applied wavelength. They thus approach a condition of short-circuiting the transmission line TL. As these lengths become exactly equal to a half wavelength for an applied frequency their effect is to substantially prevent entirely the transmission of that frequency along the line. This condition is shown in Figure 2 wherein curve 42 at point 44 approaches infinite rejection of the applied frequency at about 81.1 megacycles.

Furthermore, the open ended portions of the filter sections 12 and 16 are slightly greater in length than one-quarter wavelength, as the frequency decreases, that is, as the wavelength increases, they more and more nearly become open circuited quarter wavelength lines. They thus increasingly act as short-circuits across the line as the wavelength increases. This condition is shown by curve 42 in Figure 2 at point 46 wherein the low frequency cut-off is shown to exist at about 59 megacycles. It will be seen that the transmission factor of the filter at each of the rejection points is down at least by a factor of 100,000 to 1.

Furthermore, since the two filter elements are exactly alike, their effects on the line at their points of connection are also alike. That is, any capacitive or inductive reactance presented to the line by one filter section has as its exact counterpart an equal reactance presented to the line by the other end at a distance spaced from the first by approximately one-quarter wavelength. Due to the quarter wavelength spacing at midband frequency the effect is inverted and they therefore approximately counterbalance each other over the pass band. By adjusting the impedance of the shunt sections the band pass characteristic can be within limits made as square-shouldered as necessary, that is, points 48 and 50 of curve 42 of Figure 2 may be more widely separated or may be more closely adjacent without in any way affecting the spacing between the frequencies of infinite attenuation at points 44 and 46 of curve 2. Broadening the band widths to any desired extent within the infinite rejection frequencies does not cause a dip in curve 42 between 48 and 50 though, in extreme cases, it may be found that increased losses in the filter network limit the effect.

Curve 52 of Figure 3 shows a high rejection frequency of 78.7 megacycles at point 54 and a low rejection frequency of 61.8 megacycles at point 56. This effect is obtained with the filter network of Figure 1 by changing the length of the shorted elements to 165 electrical degrees and the open end to 105 electrical degrees both at midband frequency.

From a comparison of Figures 2 and 3 it will be seen how easy it is to change the frequencies of high attenuation of the filter network with only a relatively minor change in the electrical line lengths of the shunt filter elements. It will be noted that the curves of Figures 2 and 3 are not symmetrical about a midpoint. The filter network was arranged to have both open and closed shunt elements to obtain this effect.

If a symmetrical curve is desired a construction such as shown in Figure 4 will provide the desired symmetry about a given midband frequency. Here the first shunt element 22 is constituted by a one wavelength section of coaxial transmission line having an outer shell 23 and an inner conductor 24. The element is short-circuited at one end by an end plate 25 and at the other end by an end plate 25'. The point of connection of inner conductor 11 of transmission line TL to the inner conductor 24 is unsymmetrically arranged with respect to the ends 25 and 25' of the section. Thus the distance from plate 25 to conductor 11 is chosen as less than one-half of the mean operating wavelength while the distance from conductor 11 to plate 25' is chosen as slightly greater than one-half of the operating wavelength. Similarly, the element 26 is constituted by a coaxial transmission line section having an outer shell 27 and an inner conductor 28. In the same way, this element is closed at the ends by end plates 29 and 29'. The relative lengths of transmission line from plates 29 and 29' to the inner conductor 11 of transmission line TL are the same as for section 22. Due to the quarter wave spacing between the two shunt elements of Figure 4 the same compensating effect is obtained as was obtained in Figure 1. Considering the transmission of the filter to be down only a comparatively small amount, as the wavelength is increased the lower shunt elements, which are greater in length than a one-half wavelength, more nearly approach a half wavelength and thus act as short-circuits across the transmission line TL. Similarly, as the wavelength is decreased the upper half elements, which are shorter than a half wavelength, approach an electrical length of a half wavelength and, likewise, act as short-circuits across the transmission line.

The band pass characteristic of the filter circuit of Figure 4 is shown by curve 62 of Figure 5. It will be seen that the shape of the curve from the knee 68 to the infinite rejection point 66 is almost exactly the same as the shape from knee to the infinite rejection point 64. Thus a symmetrical band pass characteristic with high rejection points at about 59 and 81 megacycles is obtained.

An exposition of the theory of operation of the present invention will now be given, reference being made to Figures 6 to 20 as required. While it is believed that the following theory is correct, it should be clearly understood that applicant does not intend to limit his invention thereto.

Figure 6 illustrates a section of transmission line TL having shut sections S and S' connected thereacross at a distance $\theta$ apart.

Let $y(\omega)$ be the admittance of the two shunt sections.

Let $$\theta = \frac{\omega l}{V} = \frac{2\pi l}{\lambda} = \text{line angle}$$

V being the velocity of propagation in the line (velocity of light if the line uses an air dielectric), $l$ the length, $\omega$ the angular frequency and $\lambda$ the wavelength.

Solving the line equations we obtain:

$$E_s = (\cos \theta + jyZ_0 \sin \theta) E_R - (Z_0 \sin \theta) I_R$$

$$I_s = \left[2y \cos \theta + j(1+y^2 Z_0^2) \frac{\sin \theta}{Z_0}\right] E_R -$$
$$(\cos \theta + jyZ_0 \sin \theta) I_R$$

If we use the classical filter definitions we obtain the following relations:

The propagation constant $$\Gamma = \cosh^{-1}[\cos \theta - jyZ_0 \sin \theta]$$

The characteristic impedance $Z_{000}$ $$= \sqrt{\frac{jZ_0 \sin \theta}{2y \cos \theta + j(1+y^2 Z_0^2) \frac{\sin \theta}{Z_0}}}$$

$$= Z_0 \sqrt{\frac{\sin \theta}{2b \cos \theta + (1+b^2) \sin \theta}}$$

Cut-off takes place when $$\cos \theta + jyZ_0 \sin \theta = \pm 1$$

Infinite attenuation occurs when $y = \infty$

If we make the length of the section a quarter wavelength at the nominal midband frequency and call P the frequency deviation ratio, i. e.

$$P = \frac{\Delta f}{f_0}$$

we may make the following approximations for P<20% with sufficient accuracy for most purposes:

$$\sin \theta = \cos p\frac{\pi}{2} \approx 1$$

$$\cos \theta = -\sin p\frac{\pi}{2} \approx -p\frac{\pi}{2}$$

$$\cosh \Gamma \approx -p\frac{\pi}{2} + j\frac{y}{y_0}$$

When the frequency range is not very high it may be desirable to use lumped shunt circuits. These may consist of (a) two series circuits in parallel or (b) two parallel circuits in series as shown in Figures 7a and 7b. Each circuit includes an inductance L and a capacitance C with appropriate subscripts identifying the circuit.

Consider circuits of type (a) first: The admittance becomes infinite (impedance zero) when $$\omega = 2\pi f = \frac{1}{\sqrt{L_1 C_1}}$$

and $$\frac{1}{\sqrt{L_2 C_2}} = \omega_1$$

and $\omega_2$ for example.

In any case $$y = -j\omega\left[\frac{1}{L_1(\omega^2 - \omega_1^2)} + \frac{1}{L_2(\omega^2 - \omega_1^2)}\right]$$

The admittance becomes zero (impedance infinite) when:

$$\omega = \frac{\omega_2^2 L_2 + \omega_1^2 L_1}{L_1 + L_2} = \frac{\frac{1}{C_2} + \frac{1}{C_1}}{L_2 + L_1} = \omega_0$$

say, and also when $\omega = 0$.

Then $$y = \frac{-j\omega}{L_1 L_2} \times \frac{\omega_1^2 - \omega_0^2}{(\omega^2 - \omega_1^2)(\omega^2 - \omega_2^2)}$$

For a low pass filter we eliminate $L_1$, making $\omega_1$=zero.

For a high pass filter we eliminate $C_1$, making $\omega_1 = \infty$.

In the general case of a band pass filter having chosen $\omega_0$, we can choose two frequencies $\omega_1$ and $\omega_2$ of high rejection and one cut-off frequency or both cut-off frequencies and one high rejection frequency.

At cut-off $y = \pm j y_0$
when $L_1 = L_2$, $$y = \frac{-j\omega}{L_1} \cdot \frac{2\omega^2 - \omega_1^2 - \omega_0^2}{(\omega^2 - \omega_1^2)(\omega^2 - \omega_2^2)}$$

Consider circuits of type (b): The admittance of this circuit is identical with the impedance of type (a) circuit so that we need not discuss this type in detail.

For a low pass filter we eliminate $L_1$.
For a high pass filter we eliminate $C_1$.

At the very high frequencies we find it most convenient to use transmission line sections for our shunt admittance such as shown in Figures 8a, 8b and 8c and identified by reference character $tl$. Three types of circuits are of principal interest; (a) a transmission line section shorted at both ends, (b) a transmission line section shorted at one end and open at the other, and (c) a section open at both ends. These are shown in Figures 8a, 8b and 8c respectively.

Let "V" be the velocity (phase) in the sections, $l$ the length, "S" the distance to the tap as shown, $Z_{00}$ the surge impedance, and $Y_{00}$ the surge admittance of the sections.

Consider Figure 8a; the admittance $y$ is given by:

$$y = -j y_{00}\left[\cot \frac{\omega s}{V} + \cot \omega\frac{(l-s)}{V}\right]$$

$$= -j y_{00} \frac{\sin \frac{\omega l}{V}}{\sin \frac{(\omega s)}{V} \sin \omega \frac{(l-s)}{V}}$$

The zeros of $y$ are when $$\frac{\omega l}{V} = n\pi$$

or when $$l = \frac{n\lambda}{2}$$

where $n$ is an integer not including zero and $\lambda$ the wavelength on the line section (not necessarily the wavelength in air).

The poles of $y$ (infinities) are when $$\frac{\omega s}{V} = K\pi$$

or when $$s = K\frac{\lambda}{2}$$

and when $\omega(l-s) = K\pi$ or when $$l - s = K\frac{\lambda}{2}$$

where $K$ is an integer including zero.

To illustrate: If $f_0$ is the frequency at which $$l = \frac{\lambda}{2}$$

and $$\frac{s}{l} = \frac{10}{11}$$

we have a distribution of zeros and poles along a transmission line conductor TLC as indicated in Figure 9 by O's and X's.

Figure 10 shows the location of the first three poles on the frequency scale as the ratio $s/l$ is varied, $f_0$ being the frequency at which the line section tunes to a half wavelength. The zeros are stationary at $$\frac{f}{f_0} = 1, 2, 3, \text{etc.}$$

When this circuit is used in accordance with the invention the pass bands are in the vicinity of the zeros, the width depending upon the value chosen for $Y_{00}$ and the separation of the two poles (high rejection frequencies) lying on either side of the zero.

Figures 11, 12 and 13 show the admittance frequency curves versus percent frequency deviation from the frequency at which the length of the section is one wavelength for $s/l$ ratios of 0.45, 0.40, and 0.475 respectively for a single filter element such as 22, 23 of Figure 4 or the element of Figure 8a.

Figures 14, 15 and 16 show the attenuation characteristics of filters such as shown in Figure 4 built with these three ratios of $s/l$ where the shunt element has a characteristic admittance $Y_{00}$ equal to $$\frac{y_0}{3}$$

$y$ and $3y_0$, $y_0$ being the surge admittance of the main line section. The main line section is in all cases equal to $\lambda/4$ at the frequency $f_0$. It is seen that for a fixed pair of poles (high rejection frequencies) the band width is increased or decreased by decreasing or increasing $Y_{00}$ (increasing or decreasing $Z_{00}$).

Let us now consider the circuit of type (b) shown in Figure 8b, i. e. a line section open at one end and closed at the other.

The admittance is given by:

$$y = jy_{00}\left[\tan\frac{\omega(l-s)}{V} - \cot\frac{\omega s}{V}\right] = jy_{00}\frac{\cos\frac{\omega l}{V}}{\sin\frac{\omega s}{V}\cos\frac{\omega(l-s)}{V}}$$

The zeros occur when $$\frac{\omega l}{V} = (2n-1)\frac{\pi}{2}$$

and when $$l = (2n-1)\frac{\lambda}{4}$$

i. e. when the total length is an odd multiple of a quarter wavelength.

The poles of $y$ (infinities) are located at values of the angular frequency for which $$\frac{\omega s}{V} = n\pi$$

and $$\omega(l-s) = (2n-1)\frac{\pi}{2}$$

i. e. at frequencies for which S is a multiple of a half wavelength and also for which $$\frac{l-s}{l}$$

is an odd multiple of a quarter wavelength.

Figure 17:
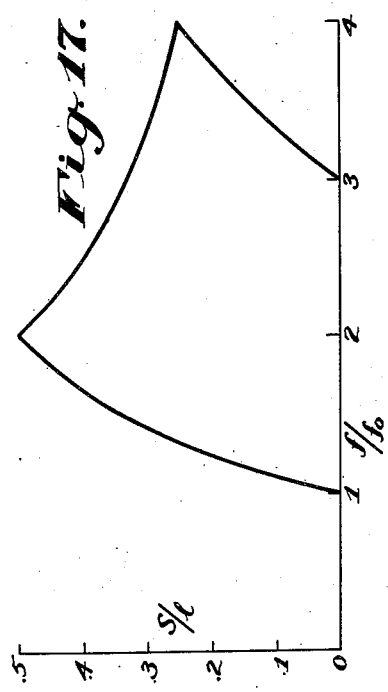

Figure 17 shows the location of the lower order poles for various ratios.

Figure 1:
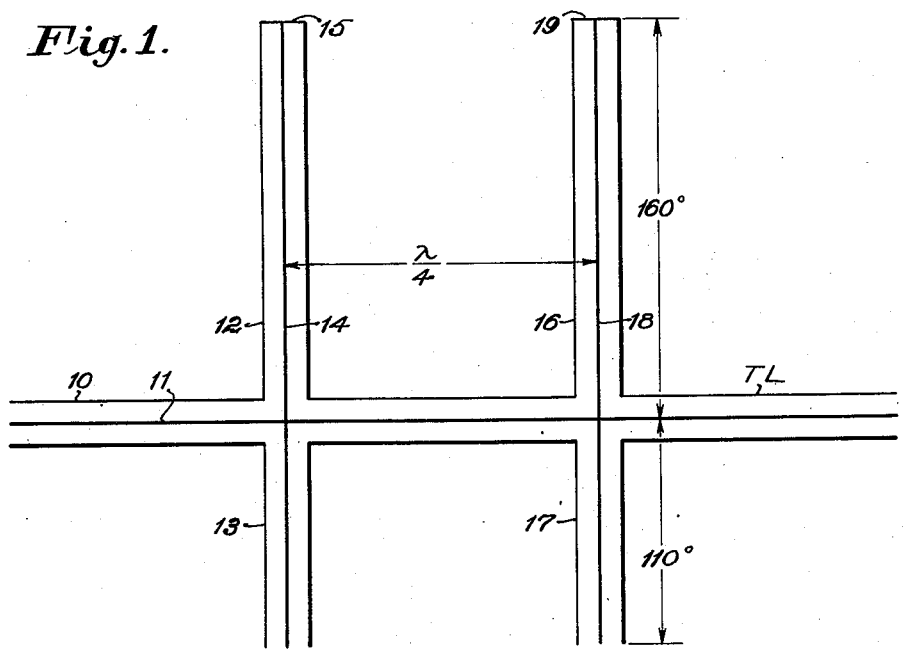
Figure 4:
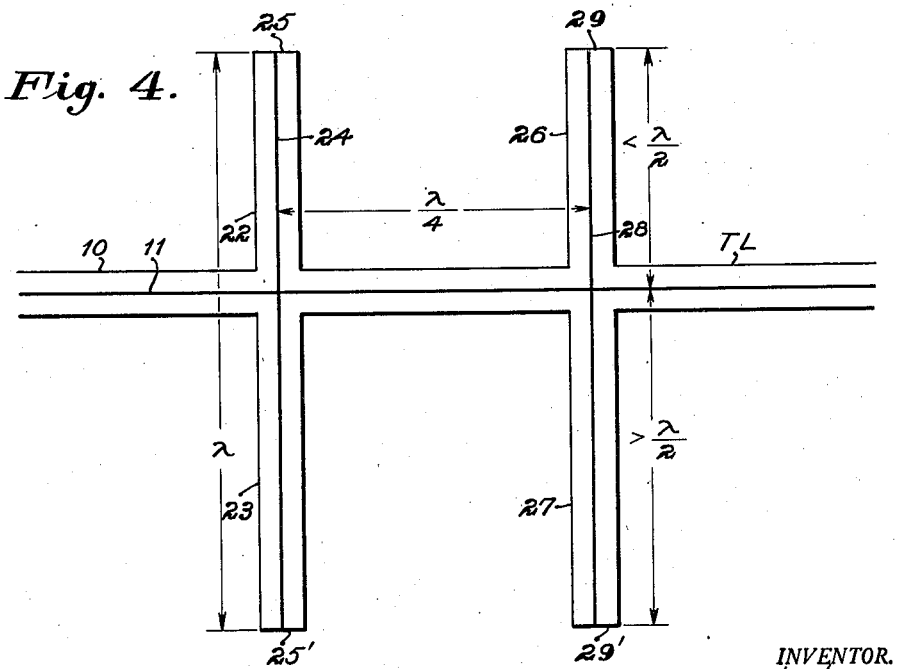
Figure 13:
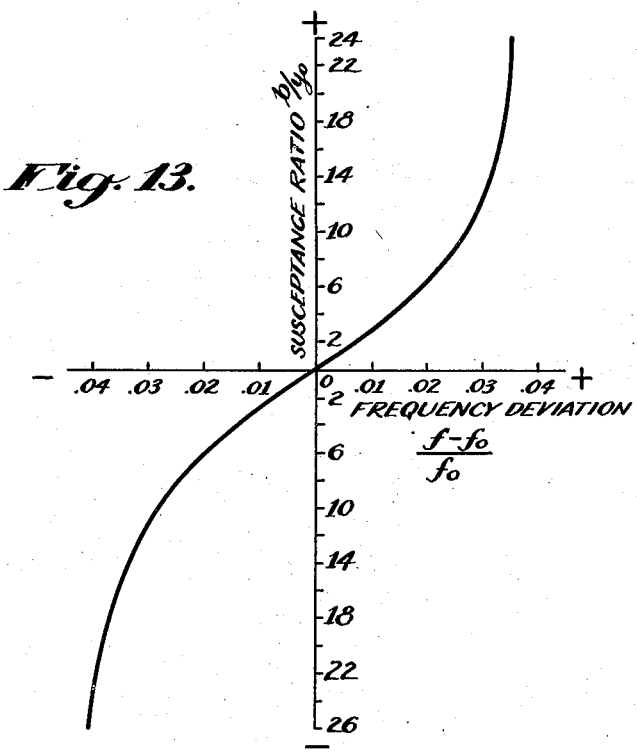
Figure 14:
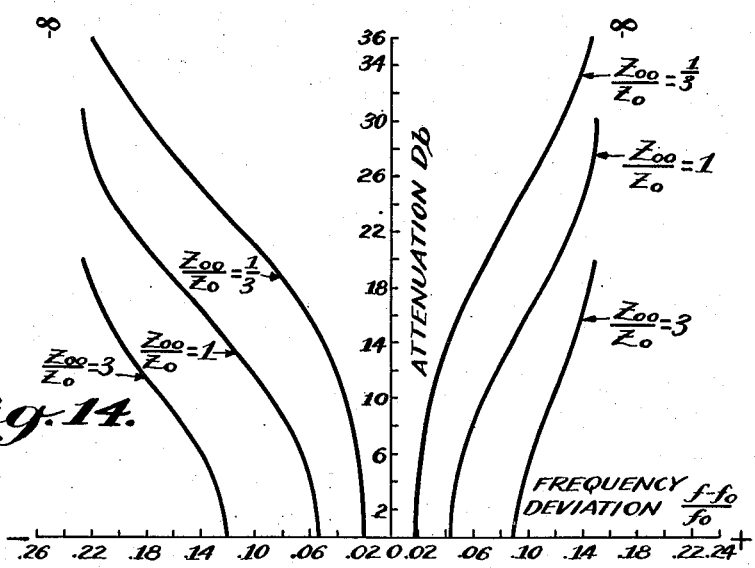
Figure 18:
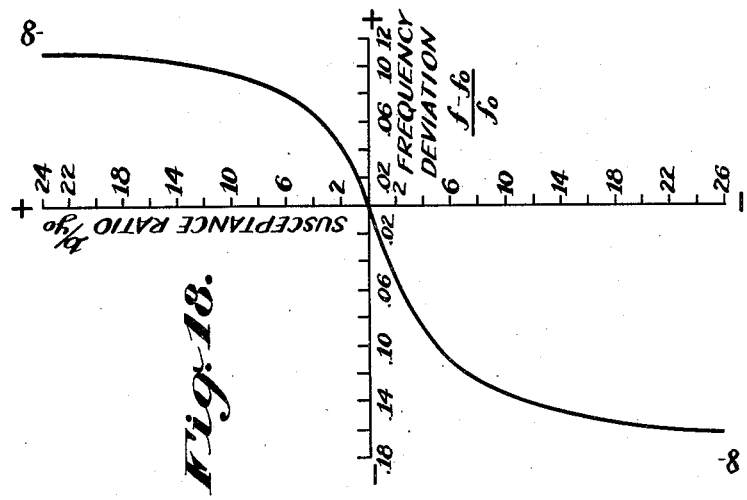

Figure 18 shows admittance vs. frequency curves for $s/l=0.592$ in terms of the percent frequency deviation from the frequency at which the overall length is ¾ wavelength. A comparison with Figures 11, 12 and 13 for the (a) type line shows the difference in symmetry in the region of the $\omega_0$ frequency.

Figure 19:
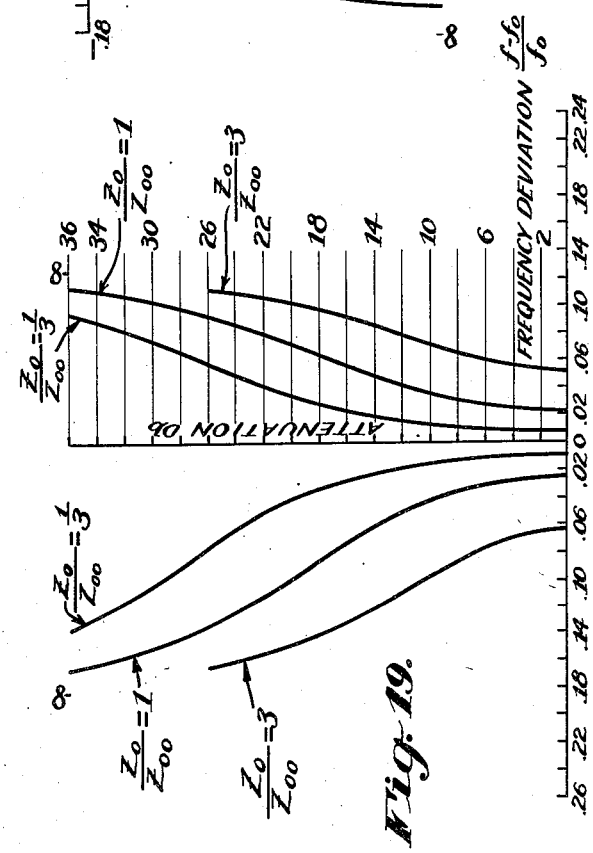

Figure 19 shows the attenuation frequency characteristic of a filter section using this type of shunt circuit where the shunt line section has characteristic admittances equal to $y_0/3$, $y_0$ and $3y_0$, the main line section having a length of one-quarter wavelength at the frequency $\omega_0$.

Lastly let us consider the characteristics of a tapped line shunt of type (c) where the line is open at both ends.

The admittance $y$ is given by:

$$y = jy_{00}\left[\tan\frac{\omega s}{V} + \tan\frac{\omega(l-s)}{V}\right] =$$

$$jy_{00} \times \frac{\sin\frac{\omega l}{V}}{\cos\frac{\omega s}{V}\cos\frac{(\omega l-s)}{V}}$$

The zeros occur when $$\frac{\omega l}{V}$$

is a multiple of $\pi$ including zero. Thus the zeros occur at the same frequencies as in the case of circuit (a) with exception of the zero frequency. At zero frequency the admittance is zero whereas for circuit (a) it was infinite.

The poles occur when the frequency is such that either S or $(l-s)$ becomes an odd multiple of a quarter wavelength. The location of the poles is shown in Figure 20.

This type of circuit is particularly useful if a low pass filter is desired, it being the only one of the three line section types having zero admittance (infinite impedance) at zero frequency.

What is claimed is:

1. A band pass filter arrangement for use with a two-conductor transmission line including a pair of two-conductor transmission line sections connected in shunt across said first mentioned line and spaced apart along said first mentioned line a distance equal to one quarter wavelength at the mean operating frequency, each of said sections being connected to said line at a point intermediate their length, the length of each of said transmission line sections from said point of connection to one end having a value at which a low resistance shunt is presented at one end of the pass band and the length of said transmission line section to the other being a value at which a low resistance shunt is presented at the other end of the pass band, whereby substantially zero attenuation is effected on said pass band and substantially infinite attenuation is effected at pre-assigned frequencies, one on either side of said pass band.

2. A filter arrangement providing a substantially flat low attenuation pass band between two predetermined cut-off frequencies and providing very high attenuation at pre-assigned frequencies lying beyond each end of said pass band, including a coaxial transmission line having an outer sheath and an inner conductor and a pair of coaxial line sections connected in shunt across said first-mentioned line and spaced apart a distance equal to one quarter of the mean operating wavelength, each of said sections being connected to the first mentioned said transmission line at a point intermediate their length, the length of each of said sections from said point of connection to one end having a value at which a low resistance shunt is presented at one of said pre-assigned frequencies and the length of the transmission line sections from the point of connection to the other end presents a low resistance shunt at the other of said pre-assigned frequencies.

3. A filter arrangement providing a substantially flat low attenuation pass band between two predetermined cut-off frequencies and providing substantially infinite attenuation at discrete pre-assigned frequencies lying beyond each end of said pass band, including a coaxial transmission line having an outer sheath and an inner conductor and a pair of coaxial line sections connected in shunt across said first-mentioned line and spaced apart a distance equal to one quarter of the mean operating wavelength, each of said sections being short-circuited at one end and open at the other and connected to the first-mentioned transmission line at a point intermediate their length, the short-circuited portion of said transmission line sections being substantially a half wavelength at one of said pre-assigned frequencies and the open-circuited portion of said transmission line sections being substantially a quarter wavelength at the other of said pre-assigned frequencies.

4. A filter arrangement providing a substantially flat low attenuation pass band between two predetermined cut-off frequencies and providing substantially infinite attenuation at discrete pre-assigned frequencies lying beyond each end of said pass band, including a coaxial transmission line having an outer sheath and an inner conductor and a pair of coaxial line sections connected in shunt across said first-mentioned line and spaced apart a distance equal to one quarter of the mean operating wavelength, each of said sections being short-circuited at one end and open at the other end and connected to the first mentioned transmission line at a point intermediate their length, the short-circuited portion of said transmission line sections being substantially a half wavelength at the higher of said pre-assigned frequencies and the open-circuited portion of said transmission line sections being substantially a quarter wavelength at the lower of said pre-assigned frequencies, whereby an unsymmetrical characteristic is obtained.

5. A filter arrangement providing a substantially zero attenuation pass band between two predetermined cut-off frequencies and providing substantially infinite attenuation at discrete pre-assigned frequencies lying on each side of said pass band, including a length of coaxial transmission line having an outer sheath and an inner conductor, and a pair of coaxial transmission line sections substantially a wavelength long at the mean operating frequency and connected in shunt across said first-mentioned transmission line and spaced apart along said first-mentioned transmission line a distance equal to one-quarter wavelength at the mean operating frequency, each of said sections being short-circuited at the ends thereof and connected to said line at a point intermediate the length thereof, the point of said connection being displaced from the midpoint of said sections by a value at which the length of each of said sections from said point of connection to one end acts as a low resistance shunt at one of said pre-assigned frequencies and the length to the other end acts as a low resistance shunt at the other of said pre-assigned frequencies.

6. A filter arrangement providing a substantially zero attenuation pass band between two predetermined cut-off frequencies and providing substantially infinite attenuation at two discrete pre-assigned frequencies lying one on each side of said pass band, including a length of coaxial transmission line having an outer sheath and an inner conductor, and a pair of coaxial transmission line sections substantially 270 electrical degrees in length at the mean frequency between said predetermined cut-off frequencies and connected in shunt across said first-mentioned transmission line and spaced apart along said first-mentioned transmission line a distance equal to one-quarter wavelength at the mean operating frequency, each of said sections being short-circuited at one end and open at its other end and connected to said line at a point intermediate the length thereof, the point of said connection being substantially greater than a quarter and less than a half wavelength from the short-circuited end at said mean frequency, whereby the length of each of said sections from said point of connection to one end acts as a low resistance shunt at one of said pre-assigned frequencies and the length to the other end acts as a low resistance shunt at the other of said pre-assigned frequencies.

7. A filter arrangement providing a substantially zero attenuation pass band between two predetermined cut-off frequencies and providing substantially infinite attenuation at two discrete pre-assigned frequencies, lying one on each side of said pass band, including a length of coaxial transmission line having an outer sheath and an inner conductor and a pair of coaxial transmission line sections substantially 270 electrical degrees in length at the mean frequency between said predetermined cut-off frequencies and connected in shunt across said first-mentioned transmission line and spaced apart along said first-mentioned transmission line a distance equal to one quarter wavelength at the mean operating frequency, each of said sections being short circuited at one end and open at its other end and connected to said line at a point intermediate the length thereof, the point of said connection being substantially 160 electrical degrees from the short circuited end, whereby the length of each of said sections from said point of connection to one end acts as a low resistance shunt at one of said pre-assigned frequencies and the length to the other end acts as a low resistance shunt at the other of said pre-assigned frequencies.

PHILIP S. CARTER.

REFERENCES CITED

The following references are of record in the file of this patent:

UNITED STATES PATENTS

| Number | Name | Date |
| --- | --- | --- |
| 1,781,469 | Mason | Nov. 11, 1930 |
| 2,088,749 | King | Aug. 3, 1937 |
| 2,128,400 | Carter | Aug. 30, 1938 |
| 2,270,416 | Cork | Jan. 20, 1942 |
| 2,419,985 | Brown | May 6, 1947 |
| 2,426,633 | Mason | Sept. 2, 1947 |